United States Patent [19]

Bartholomäus et al.

[11] 4,342,331
[45] Aug. 3, 1982

[54] HYDRAULIC CONTROL- AND/OR MEASURING DEVICE, PARTICULARLY SOLENOID-CONTROLLED FLOW REGULATING VALVE

[75] Inventors: Reiner Bartholomäus, Neuendorf; Hans Wölfges, Lohr, both of Fed. Rep. of Germany

[73] Assignee: Die G. L. Rexroth GmbH, Lohr, Fed. Rep. of Germany

[21] Appl. No.: 225,967

[22] Filed: Jan. 14, 1981

[30] Foreign Application Priority Data

Jan. 19, 1980 [DE] Fed. Rep. of Germany ....... 3001886

[51] Int. Cl.³ .................... F16K 37/00; F16K 39/00
[52] U.S. Cl. ................................. 137/553; 137/554; 137/625.38; 251/282
[58] Field of Search ............... 251/282, 325, 118, 129; 137/554, 625.38

[56] References Cited

U.S. PATENT DOCUMENTS

| | | | |
|---|---|---|---|
| 86,381 | 2/1869 | Evered | 137/625.38 |
| 3,145,927 | 8/1964 | Prouty | 137/625.38 |
| 3,960,358 | 6/1976 | Vollmer et al. | 251/282 |
| 4,167,262 | 9/1979 | Lemmon | 251/325 |
| 4,195,662 | 4/1980 | Gottel | 137/554 |

*Primary Examiner*—A. Michael Chambers
*Attorney, Agent, or Firm*—Michael J. Striker

[57] ABSTRACT

The hydraulic control- and/or measuring device has a housing and a socket-shaped control slider movable in a cylindrical bore in the housing between an open position in which it passes a pressure fluid from an inlet opening to an outlet opening; a stationary jet intercepting member projects into the blind bore of the slider and has a deflection disk located outside the range of the inlet opening to intercept fluid energy at the beginning of the opening phase.

10 Claims, 2 Drawing Figures

HYDRAULIC CONTROL- AND/OR MEASURING DEVICE, PARTICULARLY SOLENOID-CONTROLLED FLOW REGULATING VALVE

BACKGROUND OF THE INVENTION

The present invention relates generally to a hydraulic control- and/or measuring device, and in particular to a solenoid-controlled flow regulating valve having a housing body formed with a cylindrical bore and a control edge, a slide spool formed with an axial blind bore and another control edge, the spool being movable in the blind bore between an open position and a closed position, a biasing spring engaging one end of the spool, and a position controller coupled to the spool.

In a known flow meter of the aforedescribed kind the control slider has the form of a hollow cylinder and the pressure medium is permitted to flow through the control slider in its longitudinal direction. In this known design, the control slide can be influenced by the passing pressure medium only on a very limited scale.

In other known control- and/or measuring devices of this type, it has been found necessary to make the control slider in the form of a socket, that is, in the form of a sleeve provided with a bottom whereby the latter is actuated by means of an adjusting unit such as for example by a proportional solenoid. In this design of the control slider however, disadvantageous fluid energy effects or jet forces occur.

SUMMARY OF THE INVENTION

It is therefore a general object of the present invention to overcome the aforementioned disadvantage.

More particularly, it is an object of the invention to provide an improved device of the aforedescribed type in which jet forces on the control slider are substantially reduced.

In keeping with this object, and others which will become apparent hereafter, one feature of the invention resides, in a hydraulic control- and/or measuring device, in the provision of a socket-like control slider defining a blind bore, a stationary jet guiding body projecting into the blind bore, the guiding body being formed with a deflecting member extending over a major part of the inner cross section of the blind bore, and the control edge formed in the slide member being situated, at the beginning of movement of the slider into its open position, at the level of the deflecting member while in the closing position being situated near to the bottom of the blind bore.

By virtue of this construction, the jet guiding body is immediately attacked by the jet of pressure medium flowing into the blind bore of the control slider from a lateral passage. As a consequence, the jet forces are immediately intercepted before exerting any effect on the control slider. In this manner, in comparison to prior-art devices, the jet guiding or intercepting body substantially reduces the effects of the pressure fluid energy on the control slider. Inasmuch as the jet guiding body is stationary relative to the movable control slider, the intercepted jet forces are transmitted via a supporting cylindrical body into the housing of the device. By using the jet guiding body according to this invention, it is made possible that a substantially larger amount of pressure fluid can flow through the device per time unit than in similar devices that do not employ the jet intercepting body. In addition, the danger of fluttering of the control slider and of the coupled parts of the proportional solenoid is substantially reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
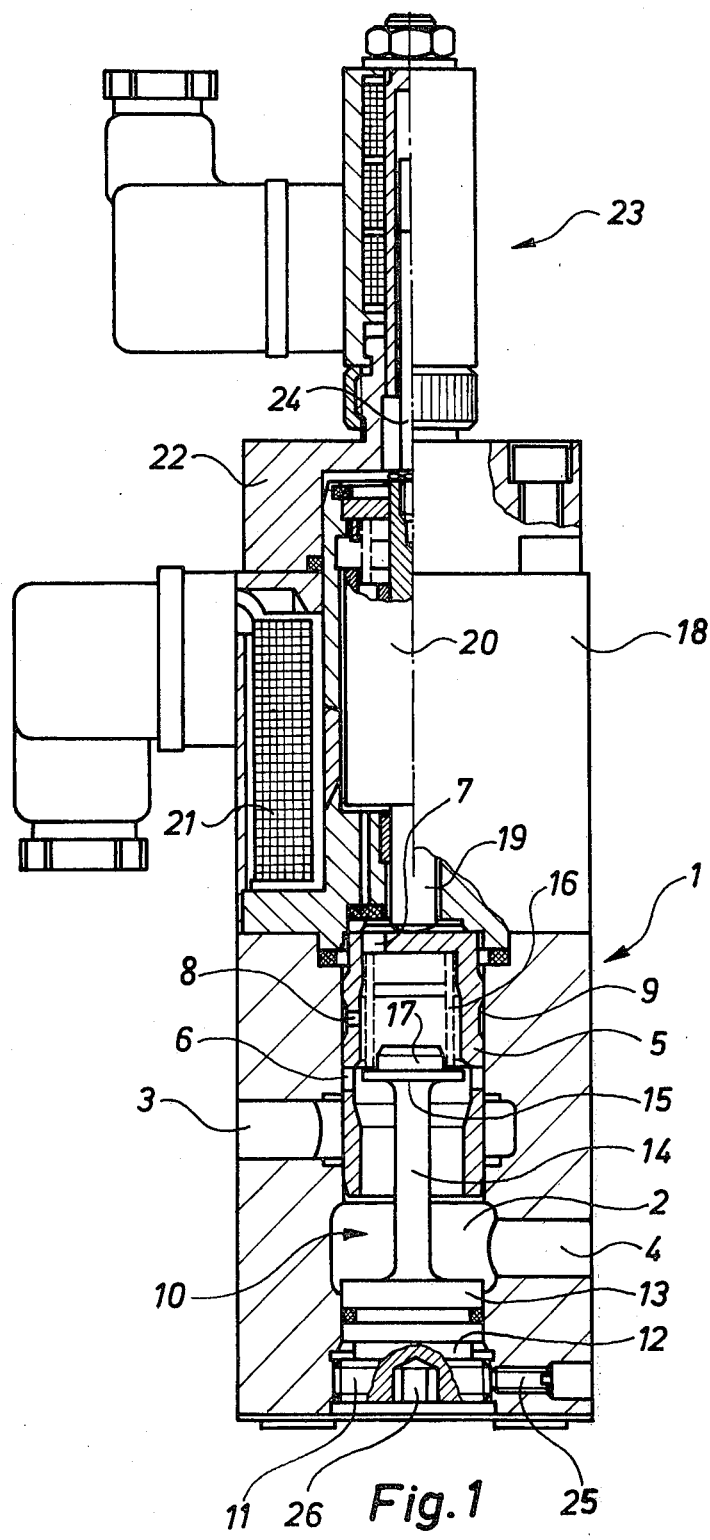
FIG. 1 is a schematic illustration, partly in longitudinal cross section, of one embodiment of a solenoid-controlled flow regulating valve according to this invention.

Referring firstly to the first embodiment according to FIG. 1, the valve includes a housing 1 formed with a longitudinal cylindrical bore 2. The bore 2 is formed with axially spaced annular grooves which communicate, respectively, with a radially directed inlet channel 3 and a radially directed outlet channel 4. A socket-shaped control slider 5 is arranged for an axial reciprocating displacement in the longitudinal cylindrical bore 2. Approximately midway of its cylindrical wall a circular array of control bores 6 is provided. Equalizing bores 7 are formed in the bottom of the control slider 5 and other equalizing bores 8 are formed in the wall of the slider between the control bore 6 and the bottom. The equalizing bore 8 communicates with an annular groove 9 formed on the outer cylindrical surface of the slider 5.

According to this invention, a jet intercepting body 10 is fixedly mounted in the cylindrical bore 2 of the housing opposite the open end of the blind bore of the control slider 5 and projects into the interior of the blind bore. The jet guiding body 10 has at its end remote from the control slider a threaded base part 11 screwed into the corresponding inner thread in the bore of the housing 1. The base part 11 is formed with a recessed step 12 which in turn supports a piston-like sealing part 13, the latter being formed with a recessed groove in which a sealing ring is arranged to engage the inner wall of the cylindrical bore 2 of the housing. The sealing part 13 is connected to a rod-like part 14 substantially reduced in diameter and projecting into the interior of the blind bore of the control slider 5. The rod-like part 14 is terminated by a disk-shaped deflection part 15 forming a flange of an increased diameter. A biasing spring 16 is provided between the deflection member 15 and the bottom of the blind bore of the slider and is held in position by a centering member 17 mounted on the deflection part 15. The jet intercepting body 10 is secured against rotation by means of a locking screw 25 engaging the threaded base 11 from a radially directed bore in the housing 1. A hexagonal well 26 is formed in the outer surface of the threaded base 11 and is accessible from the outside to be engaged by a corresponding tool by means of which the axial position of the deflection plate 15 can be accurately adjusted. The inner wall of the blind bore in the control slider 5 is formed with an annular recess extending in the range of the control bore 6 and defining a sloping wall portion. The thickness of the wall of the control slider 5 in the range of control bore 6 is thus reduced to amount to about 2 mm, whereas outside the range of the annular recess is about 3 mm.

The outer diameter of the disk-shaped deflection member 15 is slightly smaller than the inner diameter of the control slider 5 above its annular recess in the range of control bores 6. Accordingly, the section of the blind bore of the control slider 5 between the control bores 6 and the bottom of the bore can receive the deflection plate 15 with a certain small play when the control slider 5 is moved into its open position in which the control bores 6 are in register with the inlet passage 3. In this open position spring 16 is depressed and the deflection plate 15 takes place in the inner part of the blind bore away from the recessed annular space. The annular channel in the housing 1 communicating with the inlet passage 3 defines with the cylindrical bore 2 a stationary control edge, and the axial distance between this control edge and the surface of the deflection plate 15 facing the sealing member 13 should not be smaller than the value $$L=(D5-D15)/2\cdot\tan(\alpha).$$

In this equation, alpha equals the angle of stream of the pressure medium in entering the blind bore of the control slider 5, D5 is the outer diameter of the control slider 5, and D15 is the outer diameter of the deflection disk 15.

In the drawings, control slider 5 is illustrated in its rest position in which the inlet channel 3 is closed. Control bores 6 in this closed position of the slider 5 are situated a short distance from the inlet annular channel and the deflection plate 15 has its lower side approximately at the center plane of the control bore 6 so that at the beginning of the opening of the inlet channel 3, the pressure medium streaming through control bores 6 into the interior of the control slider 5 impinges against the deflection plate 15, and this impact is transmitted via the rod 14, parts 13, 12 and 11 into the housing 1 of the valve. The area of the deflection plate 15 occupies major part of the inner cross section of the blind bore of the slider 5 so that only a minimum clearance is left between the rim of the disk 15 and the inner wall of the blind bore. This clearance in the range of the control bore 6 has its maximum value defined by the increased diameter of the annular recess, and the clearance attains its minimum value in the range of the bottom part of the blind bore; this bottom part has such a diameter that in the open position of the control slider between the deflection disk 15 and the interior of the blind bore is a minimum play, whereas in the rest position of the slider the play is maximum. Similarly, the inner diameter of the blind bore decreases in the direction from the control bores 6 towards the open end of the blind bore.

The housing 18 of an actuation unit is mounted on housing 1 opposite the bottom of the control slider 5, so that the latter abuts against the housing 18 when displaced into its rest position. A rod-like adjustment member 19 is slidably supported for a reciprocating movement inside the housing 18 and is rigidly connected to an armature 20 of a solenoid, the winding 21 of which surrounds the armature 20. The adjustment solenoid constituted by the winding 21 and the armature 20 is a proportional-type solenoid well known in the art and therefore not described in detail. A cover 22 is mounted on the end face of the housing 18 remote from the slider 5. The cover 22 supports a position pick-up unit of a conventional design. The pick-up unit 23 has a feeler 24 that is connected to the armature 20. The actuation unit assembled of parts 18-21 serves for displacing the control slider 5 according to predetermined outer commands, and the position pick-up unit 23 serves for detecting the position of the slider 5.

In cooperation with a pressure compensator the flow regulation valve is capable of regulating the through flow of pressure medium independently of the load.

As soon as the control bores 6 at least partially open into the annular channel communicating with the inlet channel 3, pressure fluid streams into the interior of the control valve 5 and is deflected by the stationary deflection plate 15 in the direction of the outlet opening 4 where it is discharged.

Figure 2:
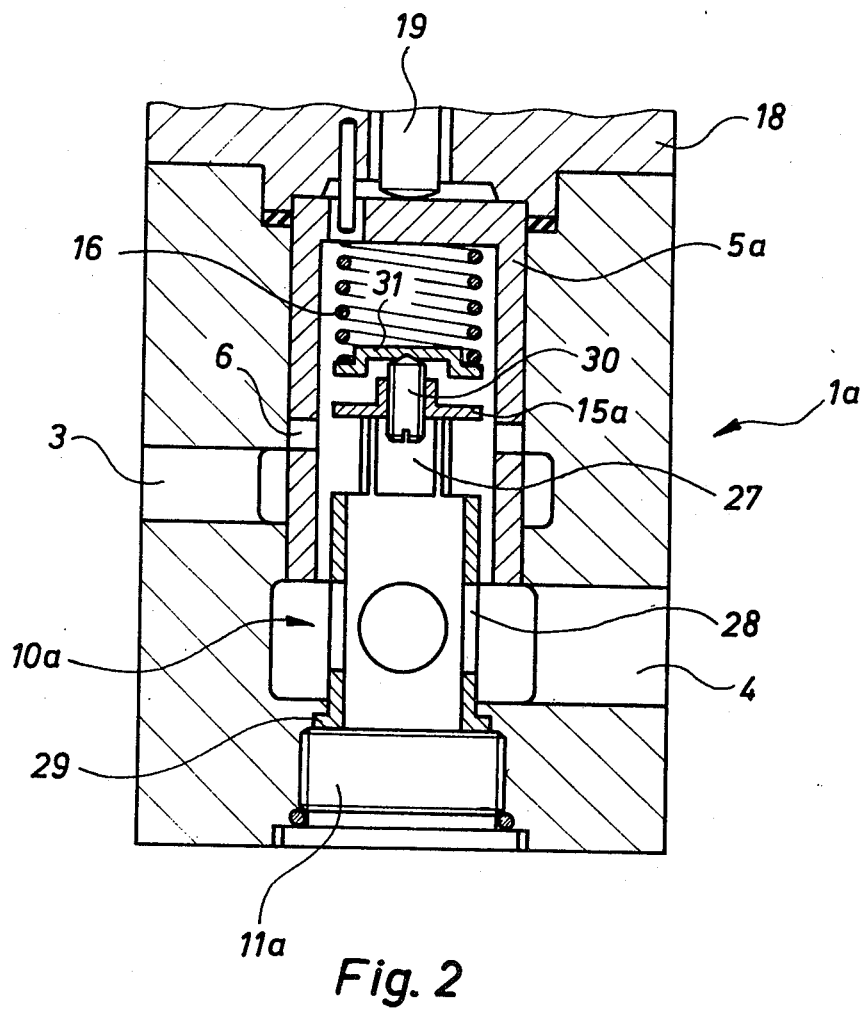
FIG. 2 is a cut away portion of another embodiment also shown in a longitudinal cross section.

In the second embodiment of the device of this invention, illustrated in FIG. 2, component parts corresponding to those in the first embodiment are designated by like reference numerals; the modified parts are indicated by a reference numeral followed by an "a". The control slider 5a in this embodiment has also a circuit-like configuration, that is, it is in the form of a sleeve provided at one end with a bottom. The jet deflecting body 10a in this embodiment has also a socket-like configuration open at one end and closed at the opposite end by the deflection disk 15a. The cylindrical wall of the jet intercepting body 10a adjacent to the deflection disk 15a is provided with cut-outs 27 separated by narrow bridges. The cut-outs 27 in the rest position of the control slider 5a are situated at the level of the control bores 6 in the wall of the slider, and the axial dimension of these cut-outs is more than twice the diameter of the control bores 6. At the level of the outlet channel 4, the cylindrical part of the jet guiding body 10a is provided with outlet openings 28 and the rim of the end of the guiding body 10a remote from the deflecting plate 15a is formed with a mounting flange 29 engaging a corresponding shoulder in the housing 1a of the valve and being held in its fixed position by a coaxial screw 11a engaging the inner thread in the cylindrical bore in the housing 1a. The cylindrical bore of the housing 1a between the annular outlet recess and the flange 29 is formed with a narrow seat snugly fitting the outer circumference of the guiding body 10a. The jet guiding body 10a projects with a certain radial play into the interior of the control slider 5a. As mentioned before, the socket-like slider 5a as well as the socket-like jet guiding body 10a have respectively a circular cross section. The control slider 5a is secured against angular displacement by means of a guiding pin so that the cut-outs 27 of the guide body 10a always face the assigned control bores 6. A setting screw 30 passes through a threaded hole in the deflection disk 15a and its pointed end is directed toward the bottom of the blind bore of the slider 5a and supports a spring cup 31 for a biasing spring 16 that rests at its other end on the bottom of the blind bore. The bottom is provided with an equalization bore 7.

The jet guiding body 10a in this second embodiment has the same function and operates in the same manner as the jet intercepting body 10 in the preceding embodiment.

It will be understood that each of the elements described above, or two or more together, may also find a useful application in other types of constructions differing from the types described above.

While the invention has been illustrated and described as embodied in a flow regulating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control- and/or measuring device, particularly an electrically controlled flow regulating valve, having a housing formed with a cylindrical bore and a control edge; a socket-shaped control slider defining an axial blind bore and another control edge cooperating with said first-mentioned control edge; the slider being movable in said cylindrical bore between an open position and a closed position; a biasing spring for engaging one end of said slider; actuation means arranged in said housing for adjusting the position of said slider; pick-up means coupled to said slider for detecting its position; a stationary jet intercepting member projecting into said blind bore and having a deflecting member extending over a major part of the inner cross section of said blind bore; said another control edge in the closed position of said slider being located at the level of said deflecting member and at the beginning of the open position of said slider said deflecting member being situated between said another control edge and the bottom of said blind bore.

2. A device as defined in claim 1, wherein said biasing spring is arranged between said deflecting member and the bottom of said blind bore of said slider.

3. A device as defined in claim 2, wherein said jet intercepting member is formed with a base mountable in said housing, a rod-like intermediate part projecting into said blind bore and a flange-like extension at the end of the rod-like member to act as said deflecting member.

4. A device as defined in claim 3, wherein said jet intercepting member is formed with a sealing flange adjoining said base.

5. A device as defined in claim 1, wherein said jet intercepting member has the form of a cylindrical socket defining an open end and a bottom, said bottom acting as said deflecting member and the cylindrical socket being provided with cut-outs adjoining said bottom, and the rim of the open end being formed with a mounting flange for engaging a corresponding shoulder in the housing.

6. A device as defined in claim 5, wherein said housing has an outlet channel and the cylindrical socket of said jet intercepting member having discharge openings at the level of said outlet channel.

7. A device as defined in claim 1, wherein the inner wall of said socket-like slider is provided in the range of said control edge with an annular groove.

8. A device as defined in claim 1, wherein the outer diameter of said deflecting member is slightly smaller than the inner diameter of the blind bore of said slider except for an annular area in the range of said control edge.

9. A device as defined in claim 1, wherein the axial distance between the one control edge in the housing bore and the intercepting surface of the deflection member is larger than or equal to $$L = (D5-D15)/2 \cdot \tan(\alpha)$$

where alpha is the angle of the jet of the pressure fluid when entering the blind bore of the control slider, D5 is the outer diameter of the control slider, and D15 is the outer diameter of the deflecting member.

10. A device as defined in claim 1, wherein said another control edge is formed by a ring of radially directed bores in the wall of said slider, said first-mentioned control edge being defined by an annular inlet channel whereby said deflecting member during the open position of the slider is situated outside the range of said control edges.

* * * * *

UNITED STATES PATENT AND TRADEMARK OFFICE
CERTIFICATE OF CORRECTION

PATENT NO. : 4,342,331
DATED : August 3, 1982
INVENTOR(S) : Reiner Bartholomäus et al It is certified that error appears in the above—identified patent and that said Letters Patent is hereby corrected as shown below:

On the title page, the name of the assignee should read

-- G. L. Rexroth GmbH --.

Signed and Sealed this

Twenty-second Day of March 1983

[SEAL]

Attest:

GERALD J. MOSSINGHOFF

Attesting Officer     Commissioner of Patents and Trademarks